(12) United States Patent
Maini et al.

(10) Patent No.: US 11,174,977 B2
(45) Date of Patent: Nov. 16, 2021

(54) TUBULAR ELEMENT TO TRANSFER ABRASIVE MATERIALS, IN PARTICULAR CONCRETE, AND METHOD TO MANUFACTURE IT

(71) Applicant: VALME S.R.L.—UNICO SOCIO, Rogolo (IT)

(72) Inventors: Paolo Dario Maini, Lissone (IT); Luca Soggetto, Como (IT)

(73) Assignee: VALME S.R.L.—UNICO SOCIO, Rogolo (IT)

( * ) Notice: Subject to any disclaimer, the term of this patent is extended or adjusted under 35 U.S.C. 154(b) by 69 days.

(21) Appl. No.: 16/389,314

(22) Filed: Apr. 19, 2019

(65) Prior Publication Data

US 2019/0323646 A1    Oct. 24, 2019

(30) Foreign Application Priority Data

Apr. 23, 2018  (IT) .................... 102018000004795

(51) Int. Cl.
| | |
|---|---|
| *F16L 57/06* | (2006.01) |
| *B22D 13/02* | (2006.01) |
| *B22D 19/02* | (2006.01) |
| *B65G 53/32* | (2006.01) |
| *B65G 53/52* | (2006.01) |

(52) U.S. Cl.
CPC .............. *F16L 57/06* (2013.01); *B22D 13/02* (2013.01); *B22D 19/02* (2013.01); *B65G 53/32* (2013.01); *B65G 53/523* (2013.01); *B65G 2207/48* (2013.01)

(58) Field of Classification Search
CPC ......... F16L 57/06; B22D 13/02; B22D 19/02; B65G 53/32; B65G 53/523; B65G 2207/48
USPC ............................................... 138/40
See application file for complete search history.

(56) References Cited

U.S. PATENT DOCUMENTS

| | | | | | |
|---|---|---|---|---|---|
| 4,357,394 | A | * | 11/1982 | Khandros | ............ B22D 13/02 138/143 |
| 5,275,440 | A | * | 1/1994 | Esser | ............ B65G 53/523 138/149 |
| 5,819,838 | A | | 10/1998 | De Vylder | |
| 6,467,812 | B1 | * | 10/2002 | Klemm | ............ E04G 21/04 285/55 |
| 8,261,767 | B1 | | 9/2012 | Blume | |
| 9,429,267 | B2 | * | 8/2016 | Dunn | ............ F16L 9/14 |
| 2002/0005222 | A1 | * | 1/2002 | Esser | ............ B65G 53/32 138/109 |

(Continued)

FOREIGN PATENT DOCUMENTS

| | | |
|---|---|---|
| CN | 102278550 A | 12/2011 |
| WO | 2012017286 A1 | 2/2012 |

(Continued)

*Primary Examiner* — Craig M Schneider
*Assistant Examiner* — David R Deal
(74) *Attorney, Agent, or Firm* — Cantor Colburn LLP

(57) ABSTRACT

A method to manufacture a tubular element for transferring abrasive materials such as concrete, inert materials or suchlike, wherein the tubular element comprises an internal tubular component made of chromium carbide or other wear-resistant material, and an internal tubular component in contact with and coaxial to the internal tubular component and made of composite material.

7 Claims, 2 Drawing Sheets

(56) References Cited

U.S. PATENT DOCUMENTS

| | | | | |
|---|---|---|---|---|
| 2003/0127854 A1* | 7/2003 | Lehnhardt | ............... | F16L 21/06 |
| | | | | 285/181 |
| 2008/0174110 A1* | 7/2008 | Olson | ................ | F16L 55/1656 |
| | | | | 285/55 |
| 2009/0115186 A1* | 5/2009 | Esser | ..................... | F16L 57/06 |
| | | | | 285/55 |
| 2009/0308480 A1* | 12/2009 | Esser | ..................... | F16L 57/06 |
| | | | | 138/141 |
| 2011/0259251 A1* | 10/2011 | Little | .................. | B65D 90/623 |
| | | | | 110/266 |
| 2013/0126033 A1 | 5/2013 | Cipolla | | |
| 2014/0096858 A1* | 4/2014 | Nam | ...................... | C22C 38/34 |
| | | | | 138/145 |
| 2014/0283942 A1 | 9/2014 | Ferre | | |
| 2017/0203368 A1* | 7/2017 | Maderud | ................ | C22C 29/06 |
| 2018/0072513 A1* | 3/2018 | Ferre' | ................. | B21D 22/022 |

FOREIGN PATENT DOCUMENTS

| | | |
|---|---|---|
| WO | 2013004018 A1 | 1/2013 |
| WO | 2013182884 A1 | 12/2013 |
| WO | 2016151370 A | 9/2016 |

\* cited by examiner

TUBULAR ELEMENT TO TRANSFER ABRASIVE MATERIALS, IN PARTICULAR CONCRETE, AND METHOD TO MANUFACTURE IT

CROSS REFERENCE TO RELATED APPLICATION

This application is related to and claims the benefit of Italian Patent Application Number 102018000004795 filed on 23 Apr. 2018, the contents of which are herein incorporated by reference in their entirety.

FIELD OF THE INVENTION

The present invention concerns a tubular element to transfer abrasive materials, in particular concrete, as well as a method to manufacture said tubular element. One of the fields of application of the present invention is the construction industry, and in particular for transporting construction materials, such as for example inert materials, or concrete, for truck-mounted pumps, irrespective of the fact that the present invention can also be used in other industrial sectors in which tubular elements are required which have at least their internal surface with a high degree of hardness and resistance to abrasion.

BACKGROUND OF THE INVENTION

In the field of construction in its widest sense the use of tubular elements is known, which are connected together to make a pipe that allows to transfer construction materials, such as for example concrete, inert materials, or suchlike, which are very abrasive, from a container, such as for example a cement mixer truck, to a casting zone, by means of pumping devices.

A pipe to transfer concrete is known, for example from EP 2855992, comprising a tubular-shaped internal layer made of a wear-resistant metal material, and an external layer made of composite material, that is, of fibers wound around the internal metal layer and immersed in a binder resin, such as an epoxy resin, urethane resin, or polyester resin. The function of the internal layer is to resist wear and it is made of tempered steel, for example C60.

The purpose of the external layer, on the other hand, is to mechanically resist the internal pressure and protect the internal layer from impacts that could occur during normal use.

Respective connection flanges are connected at the ends of the internal layer, before the winding of the external layer, to allow the subsequent reciprocal and sequential connection of several pipes.

The operations to connect the flanges to the internal layer are, however, very complex and require suitable preventive and connecting processes to be performed in order to allow the subsequent integral connection.

Flanges are usually constrained to the internal layer by interference or by welding.

However, all these operations require long production times, and the presence of particularly expert operators.

US 2013/0126033 describes a method to manufacture a double-layered curved tubular element in which a segment of curved pipe, which forms the internal layer, acts as a counter-mold to cast externally thereto the material that forms the external layer of the pipe.

US 2014/0283942 describes a method to manufacture a double-layered curved tubular element in which the external layer consists of two half-shells which are welded together around the internal layer.

CN 102278550 describes a double-layer pipe in which a flange is welded to the external layer or is made in a single piece with the external layer.

One purpose of the present invention is to provide a tubular element to convey construction materials, such as for example concrete or other abrasive materials in a fluid state, which is reliable and maintains its resistance to wear for a long time, and which is also simple to produce, relatively light and economical.

Another purpose of the present invention is to perfect a method to produce a tubular element to transfer abrasive materials, for example concrete, or other abrasive materials, which is relatively simple, economical and fast in terms of execution time.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

According to the above purposes, a tubular element to transfer abrasive materials, such as concrete, inert materials, or suchlike, according to the present invention, comprises an internal tubular component and an external tubular component in contact with one another and coaxial to a central axis.

The internal tubular component is made of a material with high characteristics of resistance to wear, since it is subject to the continuous sliding of the concrete during the activity. The external tubular component is instead made of a material with high characteristics of resistance to impacts.

According to one characteristic of the present invention, the material of which the internal tubular component is made comprises chromium carbide, in pure form or in the form of an alloy or a mixture thereof, while the external tubular component is made of composite material, in fibers, for example, but not only, carbon or glass fibers, impregnated with resin.

According to possible solutions, the wear-resistant material comprising chromium carbide has a hardness greater than or equal to 66HRC.

According to one aspect of the present invention, the method to manufacture the tubular element comprises a first step in which the internal tubular component is made by means of centrifugation technology, using a substantially cylindrical mold rotating around an axis of rotation coincident with the central axis, and casting the wear-resistant material comprising chromium carbide in its molten state inside the rotating mold.

According to another characteristic of the present invention, the method to manufacture the tubular element comprises a second step, subsequent to the first phase, in which, in contact with the external surface of the internal tubular component, the external tubular component is made with composite material in fibers.

According to another characteristic of the present invention, the material comprising chromium carbide in the molten state is conveyed toward the internal surface of the mold by distribution means, for example comprising a chute, while a corresponding translation is made between the internal tubular component and the distribution means in a direction parallel to the axis of rotation.

According to another characteristic of the present invention, during said first step a connection flange is also made at one or both the ends of the central part of the internal tubular component.

In particular, according to one aspect of the present invention, the rotary mold has undercuts, cavities, depressions, slots or other mean suitable to obtain the connection flange directly during the casting step.

According to another characteristic of the present invention, the second step is carried out by the work method of winding, for example using the filament winding technique, and using the internal tubular component already formed in the previous step as a mandrel.

According to the invention, the flange formed directly in the casting step can advantageously perform a function of gripping and stabilizing the fibers during the step of winding the fibers on the internal tubular component.

BRIEF DESCRIPTION OF THE DRAWINGS

These and other characteristics of the present invention will become apparent from the following description of some embodiments, given as a non-restrictive example with reference to the attached drawings wherein.

DESCRIPTION OF AN EMBODIMENT ACCORDING TO THE PRESENT INVENTION

Figure 1:
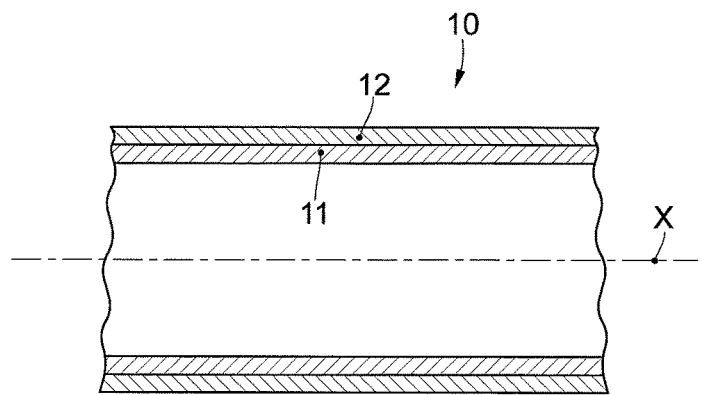
FIG. 1 is a schematic longitudinal section view of a central part of a tubular element according to the present invention.
Figure 2:
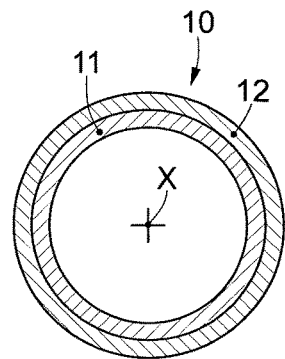
FIG. 2 is a cross section of the tubular element of FIG. 1.

With reference to FIGS. 1 and 2, a tubular element 10 to convey abrasive materials, such as concrete, inert materials, or suchlike, according to the present invention, comprises an external tubular component 11 and an internal tubular component 12, in contact with each other and coaxial to a central axis X.

It should be noted that, although in the example provided here the central axis X is rectilinear, so that the tubular element 10 is cylindrical, the central axis X can also be curved, or comprise at least one curved segment, therefore the shape of the tubular element 10 can be curved, or comprise at least a curved toroidal part, although the two tubular components 11 and 12 remain coaxial to each other.

The internal tubular component 11 is made of a wear-resistant metal material, that is, having a hardness greater than that of the external tubular component 12.

The internal tubular component 11 can be made for example of chromium carbide or other similar wear-resistant material.

By way of example only, the chromium carbide can be in pure form selected from a group comprising at least $Cr_3C_2$, $Cr_{23}C_6$ or $Cr_7C_2$.

According to possible variant embodiments, the chromium carbide can be the component of an alloy, or of a mixture, for example called Cr HARD, such as a chromium white cast iron, or $Cr_3C_2$-NiCr.

According to the different supply techniques, the composition of the carbides can vary, also according to the base material used.

The internal tubular component 11 made of material comprising chromium carbide is able to guarantee a durability, that is, a resistance to wear, which is considerably higher than a known component made of tempered steel. The chromium carbide, in fact, allows to reach greater hardnesses with respect to those of tempered steel, for example 66HRC as against 63HRC.

According to a possible solution of the invention, the internal tubular body 11 can have a hardness greater than or equal to 66HRC.

According to a possible solution of the present invention, the internal tubular component 11 can be made with centrifugation technology using a mold 15, substantially cylindrical and rotating around an axis of rotation coinciding with the central axis X. According to a possible solution of the present invention, the internal tubular component 11 is provided at one or both of its ends with a connection flange 13 (FIG. 4) which is made in a single piece with the same internal tubular body 11, directly in the step of casting the material into the mold 15, as further indicated below.

The connection flanges 13 allow to couple together two adjacent tubular elements 10, when a pipe, or a pipeline, even very long, consisting of a plurality of tubular elements 10 coupled together, is to be obtained.

According to a possible solution, the connection flanges 13 can be obtained during the same step of producing the internal tubular component 11, that is, with the same centrifugation technique.

In the example provided here, each connection flange 13 is made as an integral part of the internal tubular component 11, the mold 15 being provided, in its internal wall, with suitable cavities, depressions, eyelets or suchlike, suitable for the purpose.

The connection flange 13 can be provided with one or more parts 14 protruding radially toward the exterior, and around which, as described below, the composite material is wound to form the external component 12.

The parts 14 can have a pin conformation.

Each connection flange 13 can be provided with a plurality of such parts 14 equally distributed angularly on the perimeter of the connection flange 13 itself.

Figure 4:
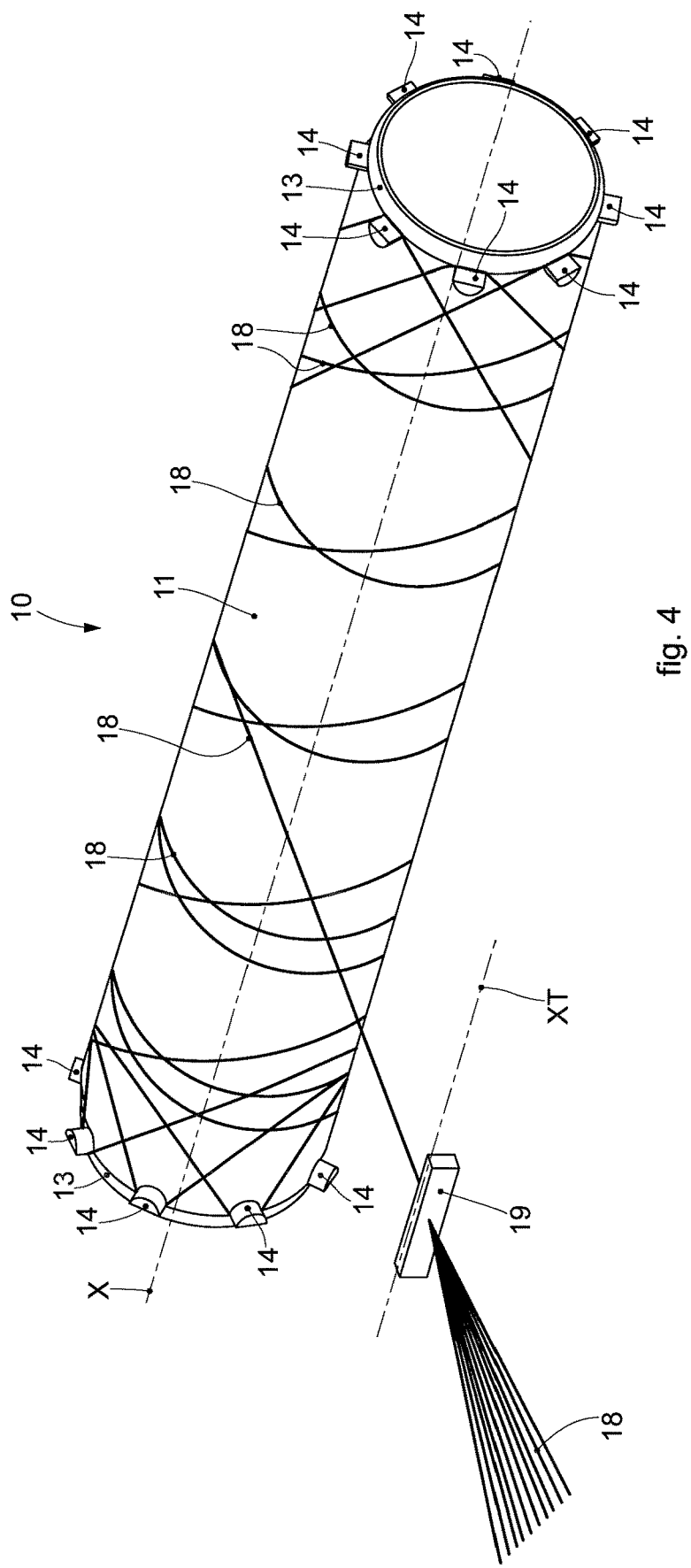
FIG. 4 is a perspective view on an enlarged scale of an end part of a tubular element according to the present invention in accordance with one embodiment.

According to possible solutions of the present invention, the external tubular component 12 is defined by a plurality of fibers 18, for example carbon or glass, wound adherent to the internal tubular component 11 according to a transverse orientation with respect to the central axis X (FIG. 4).

According to one possible solution, the fibers 18 are impregnated or drowned in a polymeric resin.

According to possible solutions, the fibers 18 can be chosen from a group comprising carbon fibers, glass fibers, basalt fibers, ceramic fibers, metal fibers, natural fibers, or a combination thereof.

The fibers 18 are wound crosswise and around the internal tubular component 11, with an angle of inclination comprised between 45° and 65° with respect to the central axis X. The winding angle represents the best compromise for resistance both to axial and also to circumferential loads.

According to a further solution of the invention, the fibers 18 can be wound on the internal tubular component 11 with the method of processing by winding, also known as the filament winding technique.

The pipe 10 made in this way allows to obtain a pipe with a mechanical resistance and a resistance to internal pressure which, by way of example only, is comprised between about 140-170 bar.

Embodiments of the present invention also concern a method to manufacture a tubular element 10 as described above which provides firstly to make the internal tubular component 11, inclusive of the possible connection flange 13 at one or both of its ends, with the possible parts 14 protruding radially.

The protruding parts 14 are useful in the subsequent step of winding the fibers 18, as they facilitate the gripping and stabilizing of the fibers 18 around the internal tubular component 11.

Figure 3:
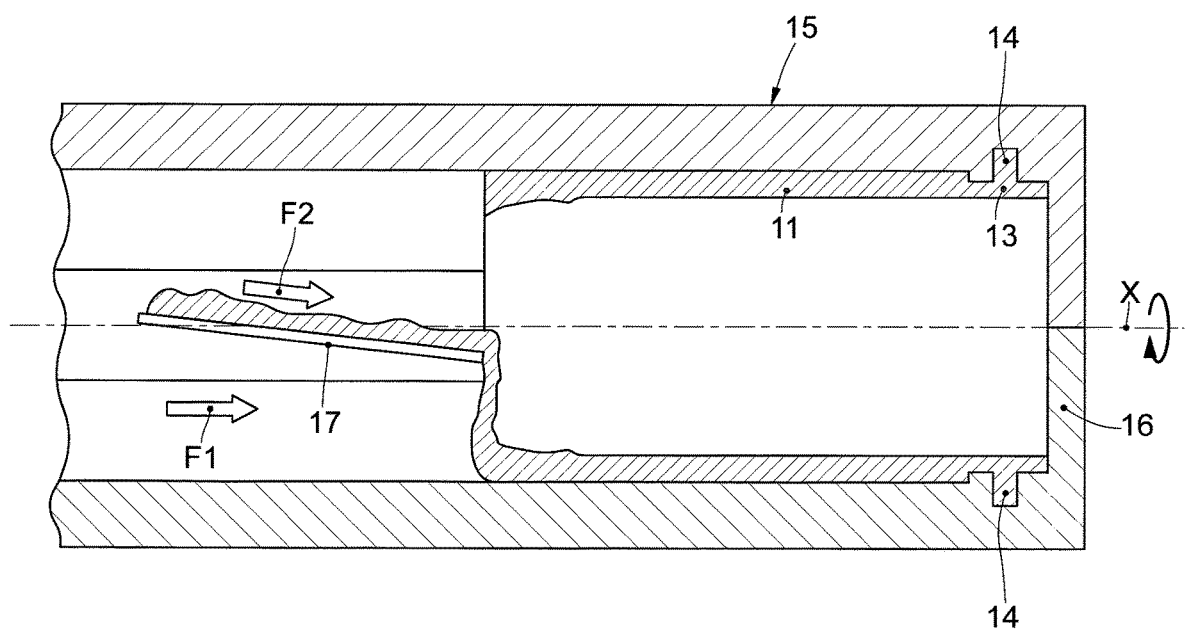
FIG. 3 is a schematic longitudinal section view on an enlarged scale of a first step of the method to manufacture a tubular element according to the present invention.

In particular, a first step of the processing method to manufacture the tubular element 10 provides to make the internal tubular component 11 with said centrifugation technology, by means of a mold 15 (FIG. 3).

The mold 15 can be made of metal material, and can have a substantially cylindrical shape, coaxial to the central axis X of the internal tubular component 11 which will be made.

According to a possible solution, the mold 15 can have at least one of its ends 16 having the shape, in negative, of the connection flange 13 to be made, possibly inclusive of the parts 14 protruding radially.

The fact that it is possible to make the connection flanges 13 already integrated in the central part of the internal tubular component 11 made of chromium carbide, while the latter is being made, during the casting itself, allows to save the subsequent technological steps which in the state of the art are necessary to attach the central part of the tubular element 10 to the connection flanges 13.

In order to make the flanges 13 directly in the casting and centrifugation step, it is possible to provide a particular type of mold 15, of a known type, made in a number of parts able to be extracted, or to open, separately at the end of the solidification of the internal tubular component 11.

The mold 15 is made to rotate at high speed around an axis of rotation of its own, coinciding with the central axis X.

By way of example only, the mold 15 can be made to rotate with an angular speed W advantageously comprised between about 100 rpm and about 150 rpm.

According to a possible solution, the mold 15 can be made to translate longitudinally, that is, parallel to the central axis X, as indicated by the arrow F1, for example at a translation speed V advantageously comprised between 7 m/min and about 11 m/min.

According to a variant, not shown in the drawings but easily understandable for a person of skill in the art, the mold 15 rotates but does not translate longitudinally, while it is the chute 17 which is translated parallel to the central axis X toward the inside of the mold 15.

At the same time, by means of distribution means 17, such as a chute, disposed inside the mold 15, chromium carbide in a melted condition, coming from an external crucible, of the known type and not shown in the drawings, is cast onto the internal surface of the mold 15, as indicated by the arrow F2.

The temperature of the chromium carbide at exit from the crucible is advantageously comprised between about 2,100° C. and about 2,200° C., while the temperature of the chromium carbide when it comes into contact with the internal surface of the mold 15 is advantageously comprised between about 1,950° C. and about 2,000° C.

Furthermore, in order to guarantee the correct compromise between the fluidity of the cast material, that is, of the chromium carbide, and the maintenance of the fluid state, and therefore guarantee the correct workability of the material, it is necessary to maintain the mold 15 at a given temperature, advantageously comprised between about 600° C. and about 700° C. This is obtained by suitable heating devices, of the known type and not shown in the drawings.

Once the internal tubular component 11 has been made as described above, a second step of the processing method is carried out to make the tubular element 10, which provides to make the external tubular component 12 with the known winding method, but advantageously using the internal tubular component 11 as a mandrel.

In particular, the internal tubular component 11 is made to rotate around its central axis X (FIG. 4), while fibers 18 are disposed in a known way, after they have been impregnated with resin, for example of the epoxy type. In this case, a slider 19 is alternately translated, by alternate translation means of a known type, along an axis of translation XT, parallel to the central axis X, from one end to the other of the internal tubular component 11, so that the carbon fibers 18 are disposed in a helix and then overlap to form a plurality of layers. A step of polymerization of the resin, of a known type, then follows, to harden the resin.

While the external tubular component 12 is being made, the fibers 18 also wind around the possible radially protruding parts 14 of the connection flanges 13, making the external tubular component 12 even more integral with the internal tubular component 11.

The advantages of the present invention are many and at least the following.

The tubular element 10 made with the method described above is much lighter than a similar known tubular element. In fact, the external tubular component 12 made of carbon fibers is much lighter than a similar external tubular component made of metal, for example steel.

The method according to the present invention allows to obtain a high industrial repeatability, decidedly greater than that of the known methods, with consequent greater reliability and stability of the final product. For example, one of the known methods, which provides an expanding step and subsequent tempering step, is instead affected by a whole series of uncertainties linked to the state of the semi-finished products, such as ovalization and curvature, which go to the detriment of the quality of the final product.

Furthermore, the productivity that can be obtained with the method according to the present invention is decidedly high, as the method is of the continuous type and can therefore be industrialized for decidedly high volumes. On the other hand, the production of the tubular elements with known methods has significant productivity limits and must also deal with the stand-by steps and the constant presence of the operators.

Furthermore, the method according to the present invention can be completely automated, so that it also allows to reduce the physical presence of the operators, also with advantages in terms of safety in the workplace.

It is clear that modifications and/or additions of parts may be made to the tubular element 10 to transport abrasive materials, in particular concrete, and to the method to produce it as described heretofore, without departing from the field and scope of the present invention.

It is also clear that, although the present invention has been described with reference to some specific examples, a person of skill in the art shall certainly be able to achieve many other equivalent forms of tubular elements to transport abrasive materials, and of the corresponding methods to produce them, having the characteristics as set forth in the claims and hence all coming within the field of protection defined thereby.

The invention claimed is:

1. A method to manufacture a tubular element for transferring abrasive materials, wherein said tubular element comprises an internal tubular component and an external tubular component in contact with each other and coaxial to a central axis (X), the method comprising:
- a first step in which said internal tubular component is made of a material comprising chromium carbide, in pure form or in a form of an alloy or a mixture thereof, said first step being achieved by centrifugation, using a substantially cylindrical mold rotating around a mold axis of rotation coincident with said central axis (X), and by casting the material comprising chromium carbide inside said mold, and
- a second step, after said first step, in which, in contact with an external surface of said internal tubular component, said external tubular component is made of a composite material in fibers impregnated with a resin,
- wherein during said first step and while said casting, a connection flange is made at one or both ends of a central part of said internal tubular component.

2. The method as in claim 1, wherein, during said first step, parts protruding radially from said connection flange are also made in said connection flange, and wherein during said second step fibers of said composite material are at least partly wound around said protruding parts.

3. The method as in claim 1, wherein said material comprising chromium carbide is conveyed toward an internal surface of said mold by distribution means while a corresponding translation is made between said mold and said distribution means in a direction parallel to said axis of rotation.

4. The method as in claim 3, wherein said translation occurs at a translation speed (V) comprised between about 7 m/min and about 11 m/min.

5. The method as in claim 1, wherein said mold is made to rotate at an angular speed
  (W) comprised between about 100 rpm and about 150 rpm.

6. The method as in claim 1, wherein said composite material comprises carbon, glass fibers impregnated with resin.

7. The method as in claim 6, further comprising, in the second step, winding the fibers upon the internal tubular component as a mandrel.

* * * * *